United States Patent [19]

Hamilton et al.

[11] Patent Number: 5,222,122
[45] Date of Patent: Jun. 22, 1993

[54] PAYPHONE HAVING MASTER AND SLAVE MODES

[75] Inventors: Thomas H. Hamilton, Indianapolis; Daniel W. Macauley, Fishers, both of Ind.

[73] Assignee: AT&T Bell Laboratories, Murray Hill, N.J.

[21] Appl. No.: 860,952

[22] Filed: Mar. 31, 1992

[51] Int. Cl.$^5$ .......................................... H04M 17/00
[52] U.S. Cl. ...................................... 379/32; 379/102; 379/143
[58] Field of Search ...................... 379/32, 34, 92, 102, 379/112, 143, 147

[56] References Cited

U.S. PATENT DOCUMENTS

| | | | |
|---|---|---|---|
| 4,124,774 | 11/1978 | Zarouni | 179/6.3 |
| 4,599,492 | 7/1986 | Otten | 179/6.3 |
| 4,654,784 | 3/1987 | Campanini | 364/200 |
| 4,726,017 | 2/1988 | Krum et al. | 370/85 |
| 4,726,057 | 2/1988 | Doerry et al. | 379/145 |
| 4,766,548 | 8/1988 | Cedrone et al. | 364/479 |
| 4,815,105 | 3/1989 | Bottoms et al. | 375/37 |
| 4,937,862 | 6/1990 | Kosich | 379/112 |
| 4,980,913 | 12/1990 | Skret | 380/23 |
| 5,007,077 | 4/1991 | Fields et al. | 379/143 |
| 5,007,520 | 4/1991 | Harris et al. | 194/317 |

Primary Examiner—Stafford Schreyer
Attorney, Agent, or Firm—Michael A. Morra

[57] ABSTRACT

A microprocessor-controlled coin telephone station includes apparatus that enables it to provide dialed telecommunications service and accept payment therefor—which is its primary function. The coin telephone station further includes apparatus for automatically dialing predetermined telephone numbers, automatically answering incoming telephone calls, and apparatus for monitoring conditions associated with its primary function in order to be a participating member of a hierarchal reporting network—which is its secondary function. In order to carry out the secondary function, the coin telephone station stores operating instructions which cause it to operate as either a Master or a Slave station within the hierarchal network. The operating instructions are downloaded into the telephone station from a Host computer over the Public Switched Telephone Network, which enables it to remotely reconfigure its hierarchal network of telephone stations to efficiently accommodate additional stations and periodic changes in the cost of long distance telephone calls.

20 Claims, 14 Drawing Sheets

PAYPHONE HAVING MASTER AND SLAVE MODES

TECHNICAL FIELD

This invention relates to telecommunication stations in general, and more particularly to an arrangement for interconnecting such stations into a single network.

BACKGROUND OF THE INVENTION

Coin-operated devices occupy a prominent role in fulfilling consumer needs in today's society. In order for such devices to be effective, however, they must be fully operational, which is to say that they contain an adequate supply of products, that they can accept payment for its products, and that they are capable of delivering products. In particular, the telephone industry maintains an extensive network of coin-operated telephones, so prompt and efficient collection and maintenance visits are important factors in the overall profitability of its network. For example, there is unnecessary waste in dispatching a person to collect a partially filled collection box. In the past, attempts to predict optimum collection schedules were based, to a large extent, on extrapolations of previous records. This problem was solved by having each coin-operated device periodically communicate its status to a reporting station so that it could be properly maintained.

U.S. Pat. No. 4,124,774 discloses a Telephone Station Coin Memory and Control System wherein each time a call is made from a payphone, circuitry within the local switching office which serves the payphone interrogates the memory of the payphone to obtain information regarding the precise number and type of coins deposited since the last collection in order to measure coin box fill. The local switching office is sometimes known as the Telephone Company Central Office. Frequency shift keyed (FSK) signals are used to transmit this information to the Central Office which is equipped with a coin processor and centralized coin information storage for a plurality of payphone stations. Although this technique is useful when a dedicated link exists between the payphone and the reporting station (e.g., the Central Office), private payphones are not maintained by the telephone company. Consequently, individual telephone calls must be made between the payphone and its reporting station. Unfortunately, in a large network of coin-operated devices, many of the calls are not local and require payment.

Polling is a well-known procedure in which the reporting station itself initiates a telephone call to each payphone in order to check the operational status of the payphone and to download information, such as new charging rates, into its memory. This procedure is somewhat unsatisfactory due to the number of toll telephone calls that must be made only to learn that all is well. Unfortunately, increasing the time interval between polling calls leads to a corresponding increase in the number of payphones that are out of service. One solution to this dilemma is to have the payphone call the reporting station only when maintenance is required. U.S. Pat. No. 4,599,492 discloses such a system in which each payphone, in a group thereof, includes circuitry for dialing a predetermined telephone number during a maintenance condition. While such a technique has advantages, a large number of toll calls are still required—not only by the payphone, but also by the reporting station to verify that the payphone is capable of making an outgoing call.

Even in the most streamlined networks where the coin-operated devices (Slave stations) report to local data collection sites (Master stations) so that only one toll call from each local area needs to be made, there are still deficiencies. For example: special equipment is normally required at the Master station, changing the locations of Master stations is occasionally necessary, changes in local and long distance calling rates preclude any one network structure from being optimum for long, and adding new coin-operated devices to the network leads to a different optimum network configuration. In short, it is highly desirable to be able to reconfigure a network of coin-operated-type devices with minimum cost and inconvenience.

SUMMARY OF THE INVENTION

An intelligent (microprocessor-controlled) terminal primarily functions to deliver a predetermined product or service and includes means for monitoring the status of its primary function. Secondarily, the intelligent terminal functions as a member of a network of Master and Slave stations that communicate with each other over the switched telephone network, and also includes means for automatically dialing predetermined telephone numbers from a group thereof and automatically answering incoming telephone calls. The intelligent terminal further includes a microprocessor that controls its secondary function in accordance with software instructions stored in memory. In response to control signals received over the switched telephone network, the software instructions are replaced with a new set of instructions. As a result, the secondary function of the intelligent terminal can be remotely changed to reconfigure it as a Master station or as a Slave station.

In an illustrative embodiment of the invention, the intelligent terminal comprises a coin telephone station whose operation is remotely controlled in accordance with instructions received from a Host computer. Typically, the Host computer transmits charging rate information to the Master stations that, in turn, forward this information to their associated Slave stations. Passwords are exchanged to verify the identity of the stations. Maintenance conditions, such as collection box fill, are periodically transmitted from the Slave stations to its associated Master station which, in turn, forwards this information to the Host. The Host computer reconfigures the network by downloading new operating instructions and new reporting relationships into certain coin telephones. Advantageously, maintenance personnel need not be dispatched and equipment need not be added, or moved, to rearrange a network of coin telephone stations.

It is an advantage of the present invention that special data collection equipment is not required because the same intelligent terminal not only carries out its primary function (e.g., coin telephone station, vending machine, automatic teller machine, etc.) but also is capable of assuming different secondary functions as a member of a data collection and reporting network.

BRIEF DESCRIPTION OF THE DRAWING

The invention and its mode of operation will be more clearly understood from the following detailed description when read with the appended drawing in which.

DETAILED DESCRIPTION

Modern electronic equipment has yielded to the incorporation of microprocessors to improve functionality and reduce cost. Equipment that once was built using mechanical devices now mostly comprises electrical devices because they are less expensive, smaller, and typically more reliable. Fortunately, most equipment functions can be implemented with a limited amount of special purpose hardware such a transducers, switches, and motors, plus software that tells the hardware what to do under various conditions. Microprocessors operate as an interface for controlling hardware in accordance with stored software instructions. Coin telephone stations are an excellent example of where microprocessors have vastly improved functionality and reliability while providing a substantial decrease in size and cost. Throughout the specification, the invention is applied to a network of public telephone stations; however, it is understood that it can be applied to equipment having different types of primary functions. For this reason, a public telephone station is occasionally referred to as an "intelligent terminal" which generically implies apparatus that includes a microprocessor and memory.

Figure 1:
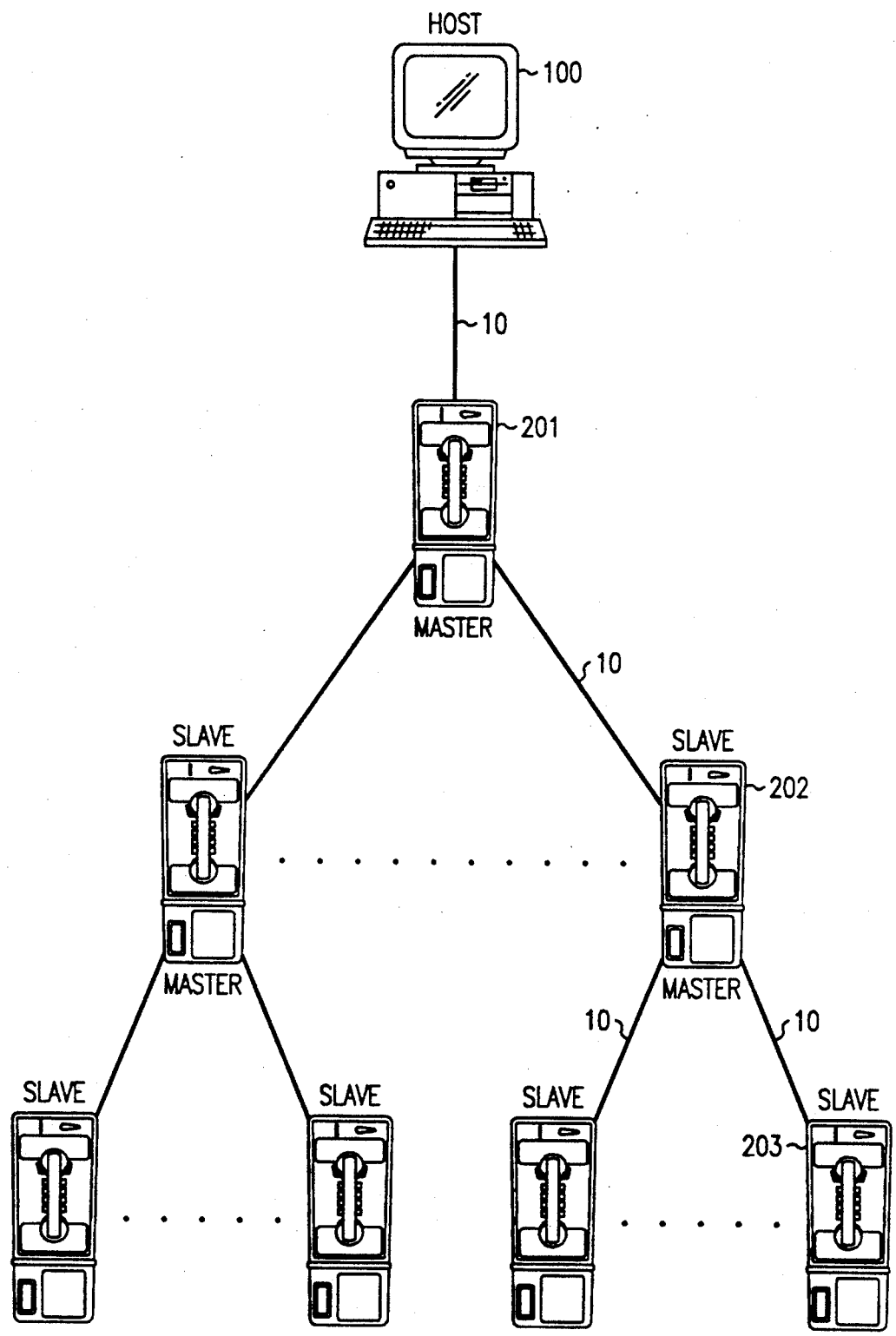
FIG. 1 discloses a 4-level hierarchal network of coin telephone stations with Master and Slave stations interconnected in independent clusters.

FIG. 1 discloses a 4-level hierarchal network of coin telephone stations with Master and Slave stations interconnected in independent clusters. Stations 201, 202, 203 that are under the control of a Host computer 100. Although solid communication links 10 are shown connecting the various stations, they merely represent the reporting relationship between the various stations. Communication links are established by dialing a telephone number using the Public Switched Telephone Network (PSTN). Because the primary function of telephone stations 201, 202, 203 is to provide switched telephone service, connection to the PSTN already exists. However, if the invention were applied to vending machines, for example, connection to the PSTN would have to be added in order to implement the secondary function of data collection and reporting. It is noted that telephone stations 201, 202, 203 all provide basic public telephone service even though some are labeled "Master" while others are labeled "Slave." Each of these telephone stations is illustratively constructed in the manner shown in FIG. 3 which is discussed below. As indicated in FIG. 1, Slave stations 203 each report to a specific Master station 202 which is a Slave station to Master station 201. Although not indicated, the Slave stations are capable of dialing any telephone number including that of the Host computer 100. As will be discussed below, calls to the Host computer are only made by a Slave station under certain conditions.

Figure 2:
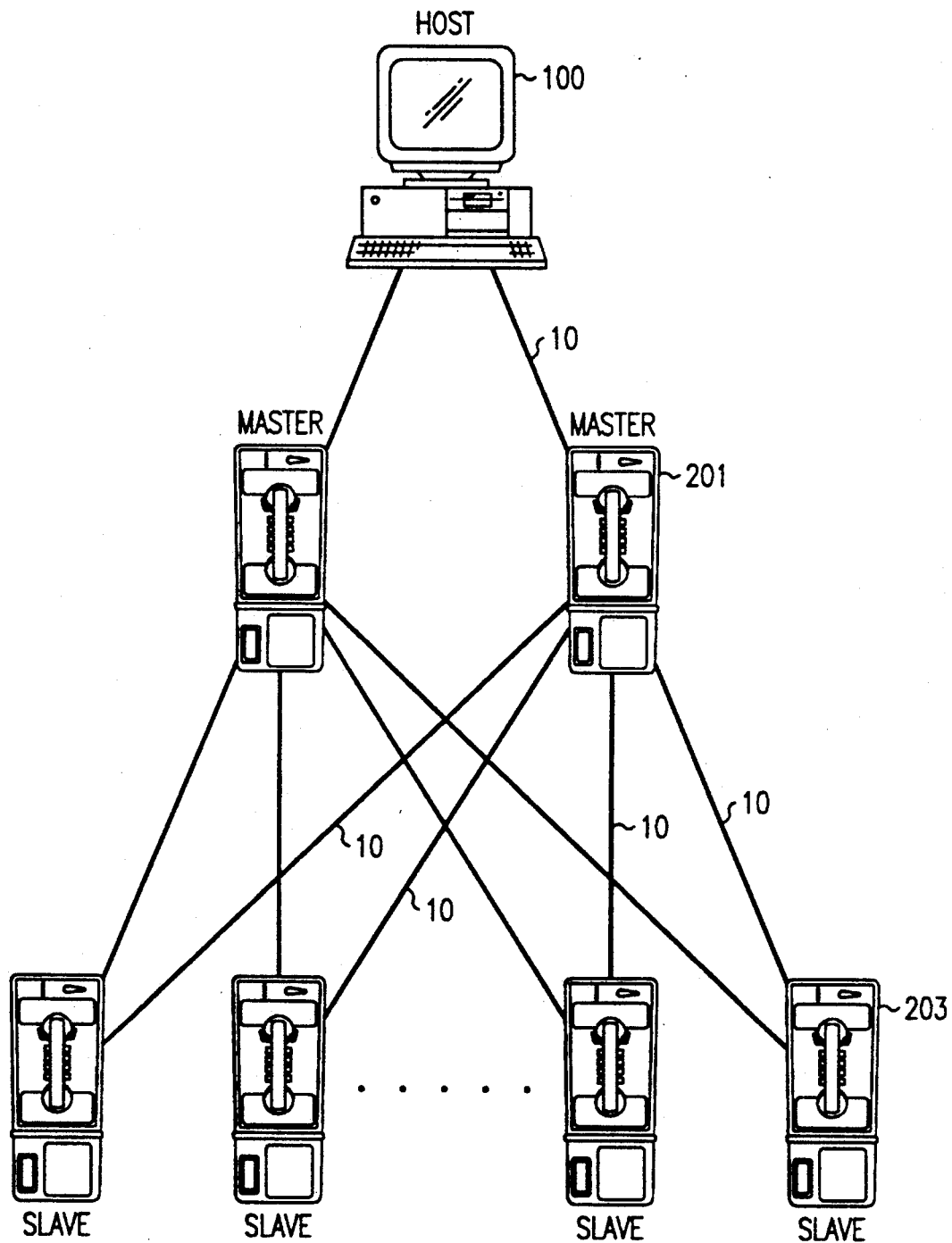
FIG. 2 discloses a 3-level hierarchal network of coin telephone stations with Master and Slave stations interconnected in linked clusters.

FIG. 2 discloses a 3-level hierarchal network of coin telephone stations with Master and Slave stations interconnected in linked clusters. Slave stations 203 are shown reporting to different Master stations 201 to illustrate the flexibility offered in the present invention. One of the Master stations may be used for receiving alarm/maintenance conditions (e.g., full coin box) from the associated Slave stations, while the other is used for delivering new cost information to them when calling rates are changed. As shown, each of the stations 201, 203 and Host computer 100 use communication links 10, the PSTN, to exchange information.

Figure 3:
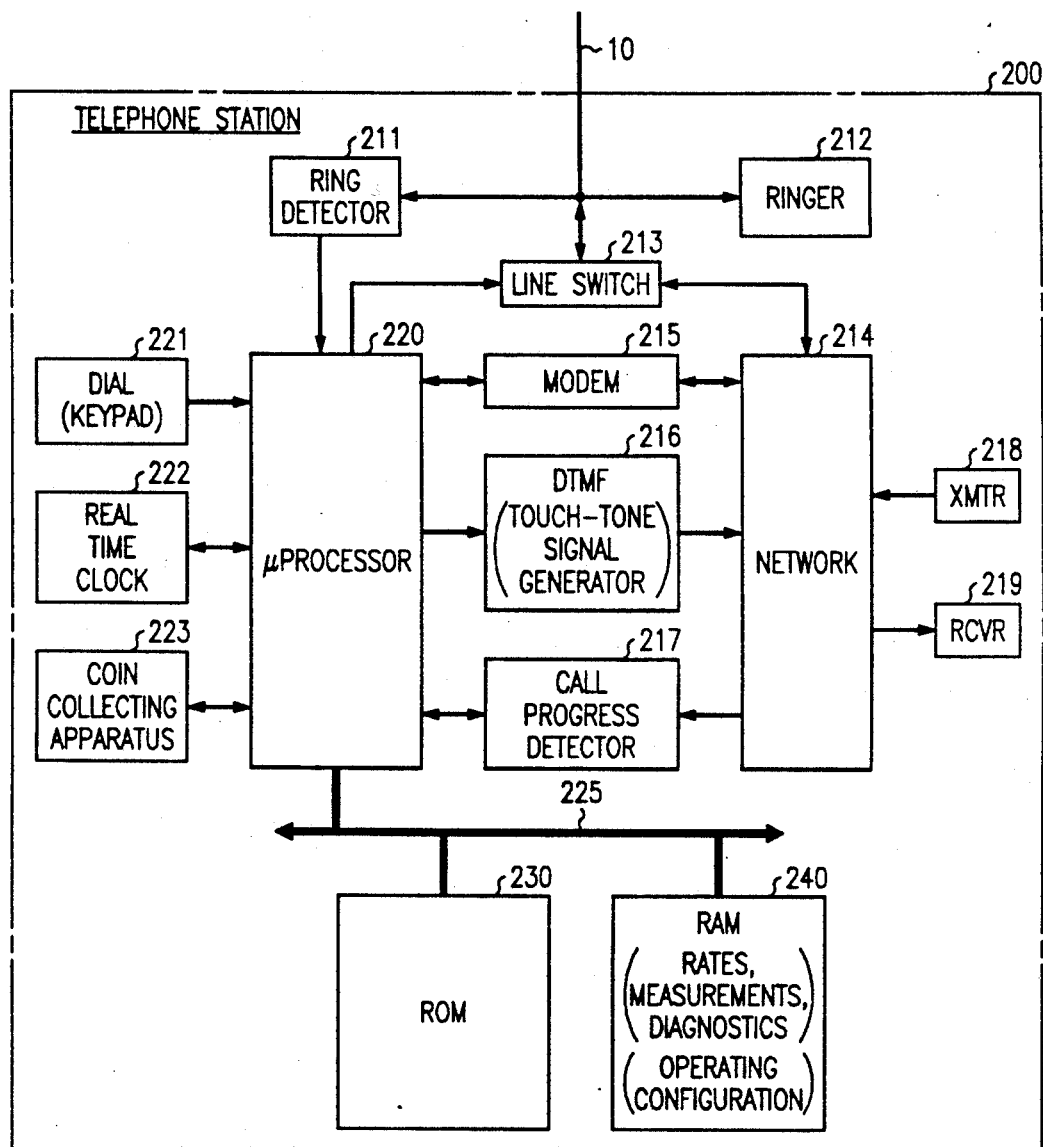
FIG. 3 discloses a block diagram of a microprocessor-controlled coin telephone station showing its major functional elements.

FIG. 3 discloses a block diagram of a microprocessor-controlled coin telephone station 200, according to the invention, showing its major functional components. The primary function of the telephone station is to provide telephone service in exchange for deposited coins. With appropriate software instructions stored in random access memory (RAM) 240, telephone station 200 can function as any one of the stations 201, 202, 203 shown in FIG. 1, 2. Telephone station 200 is controlled by microprocessor 220 which receives information from a number of sources and then performs certain actions based on the information received. For example, when a user wishes to place a telephone call, he presses certain keys on dial 221 which are sensed by the microprocessor 220. In response, the microprocessor delivers signals to block 216 which is a Dual Tone MultiFrequency (DTMF) oscillator which generates touch-tone signals for transmission over the communications link 10 to a Telephone Company Central Office. Block 216 is a 2089 DTMF signal generator which is commercially available from a number of vendors. It further includes the ability to decode touch-tone signals into corresponding digital numbers. A suitable microprocessor is available from Texas Instruments as their TMS 70C02—an 8-bit device.

The presence of an incoming ringing signal, from the Central Office, is detected by ring detector 211 and forwarded to the microprocessor 220. In response, the microprocessor causes line switch 213 to operate which provides the DC continuity between the two incoming wires of communications link 10 needed to answer the incoming call. Until the call is answered, ringer 212 continues to generate an audible alerting signal. Network 214 is a conventional 2-wire to 4-wire hybrid circuit which separates the transmitting and receiving directions. Line switch 213 is also mechanically operated when a handset comprising transmitter 218 and receiver 219 is lifted by the user.

Call progress detector 217 detects a variety of signals that are present on the telephone line (communication link 10) including: dial tone, special information tones (SIT), busy signals, etc. The design of a suitable call progress detector is disclosed more completely in U.S. Pat. No. 4,726,057. Microprocessor 220 and call progress detector 217 cooperate in the analysis of different signal patterns according to program instructions stored in ROM 230.

Coin collecting apparatus 223 is an electronic coin chute, similar to the electronic coin chute (ECC) disclosed in U.S. Pat. No. 5,007,520. It is noted that the ECC includes its own microprocessor that cooperates with coin sensing circuitry within the coin chute to determine when a coin is inserted into the chute, the size of the coin, and its composition. With this data, a decision on the validity of the coin is made. Valid coins are accepted by routing them into a collection box while invalid coins are rejected by routing them into a return chute. The microprocessor associated with coin collecting apparatus 223 maintains a memory of the number and type of coins presently contained within the collection box. Such information is used to calculate the volume of the collection box that is presently occupied by coins. Microprocessor 220 can access this information along with other maintenance information associated with the ECC (e.g., a stuck coin or other malfunction).

Real time clock 222 provides information to microprocessor 220 regarding the time of day and the date. This information is used for calculating charging rates based on when the call is made and its duration. Telephone usage statistics are also generated using the real time clock. For example, money collected during a month can be tracked using selectable start/stop dates.

Modem (Modulator/Demodulator) 215 transmits and receives data at a 300 baud rate using frequency shift keyed signals to communicate with other, similarly equipped, telephone stations or the Host computer. A suitable device is available from National Semiconductor Corp. as their 74HC943 integrated circuit. In addition to receiving programming data which configures the telephone station to operate in the Master or Slave modes, or which enters new calling rates, station management data is transmitted. Examples of such data include:

number of calls
initial minutes
initial period collections
overtime minutes
overtime period collections
money collected
time and date
disposition (busy, answered, SIT, etc.)
call type.

These data may be classified based on: call type, calls to particular zones, time of day, etc. Such statistics are eventually transmitted to the Host computer and analyzed to improve service for customers, and to improve resource management for owners of the telephone stations. Indeed, based on such data, it is frequently desirable to reconfigure the Master/Slave relationships. For example, if one of the telephone stations does not have much usage in its primary function (coin telephone), then that station might be a good choice for a Master station in its secondary function (member of a reporting network). As a Master station, the telephone station periodically polls its Slave stations and then forwards the polled information to the Host computer. The added task of being a Master station need not be permanent, but can be changed as calling patterns change throughout the year. Accordingly, the ability to easily reconfigure the reporting relationships among a plurality of telephone stations in a hierarchal network is highly desirable.

Microprocessor 220 causes telephone station 220 to function in accordance with instructions stored in memories 230, 240 that connect to the microprocessor over bus 225. Read-Only-Memory (ROM) 230 stores instructions that cannot be changed including instructions that enable the telephone station to perform its unchanging primary function and for receiving information into non-permanent memory 240. A suitable device for ROM 230 is a TMS 27C256 (32 Kbyte) memory. Random Access Memory (RAM) 240 stores instructions that can be changed including instructions that enable it to operate as a Master station or a Slave station as well as information on telephone calling rates. A suitable RAM is the MS62256CLL (32 Kbyte) memory which is commercially available from MOSEL. In order to conserve memory space, only the operating instructions needed by the telephone station to carry out the tasks of a Master station or a Slave station are stored. Telephone station 200 uses commercial (115 VAC) power which is susceptible to occasional, brief outages. Unfortunately, the data stored in RAM 240 will be lost if power to the RAM is ever interrupted. This potential problem is avoided by using a 3-volt lithium battery to backup the voltage supplied to RAM 240.

Diagnostics

Central to the health of a network of devices that dispense predetermined products or services is the ability of each device to monitor its operating status. In the case of a vending machine, for example, it is important to assure that enough product (soft drink, candy bar, etc.) is available and that the coin collecting apparatus is functional because dispensing such products is the primary function of this device. The efficient delivery of diagnostic (alarm) information regarding the operational status of the device is the secondary function of each device.

In the illustrative embodiment of the invention, dispensing telephone service is the primary function of each device, and a particular set of alarm conditions is monitored as follows:

On-Hook Too Long: Generated whenever the handset is on-hook for a programmable length of time (1 to 255 hours).
Off-Hook Too Long: Generated whenever the handset is off-hook for a programmable length of time (1 to 255 hours).
Collection Box Generated whenever the collection box is not
Missing: replaced within a programmable length of time (1 to 255 hours).
Insufficient Generated whenever the initial coin deposit
Deposit: is not received for X consecutive coin calls.
No Connect: Generated when the answer detect algorithm detects X consecutive non-connected calls.
Button Stuck: Generated when the telephone station detects the same button pressed for a programmable number of consecutive seconds.

Collection Box Generated when the collection box dollar count
Dollar Threshold: reaches a programmable limit (1 to 2000 dollars).
Collection Box Generated when the collection box fill volume
Volume Threshold: reaches a programmable limit (1 to 120 percent).
Collection Box Removed: Generated when the collection box is removed.
Service Access: Generated when a service access code is typed into the keypad. This code is programmed by the Host and may be up to 10 digits long.
Chute Failure: Generated when the ECC signals a failure.
Coin Timeout: Generated when the ECC signals a failure. (X coin timeouts within Y minutes)
Hopper Full: Generated when the ECC signals that a coin has not cleared the chute.

Master Station Operation

Reference is made to FIG. 3 regarding the identification of specific components that are identified in connection with the following routines and subroutines used by the Master station.

Figure 4:
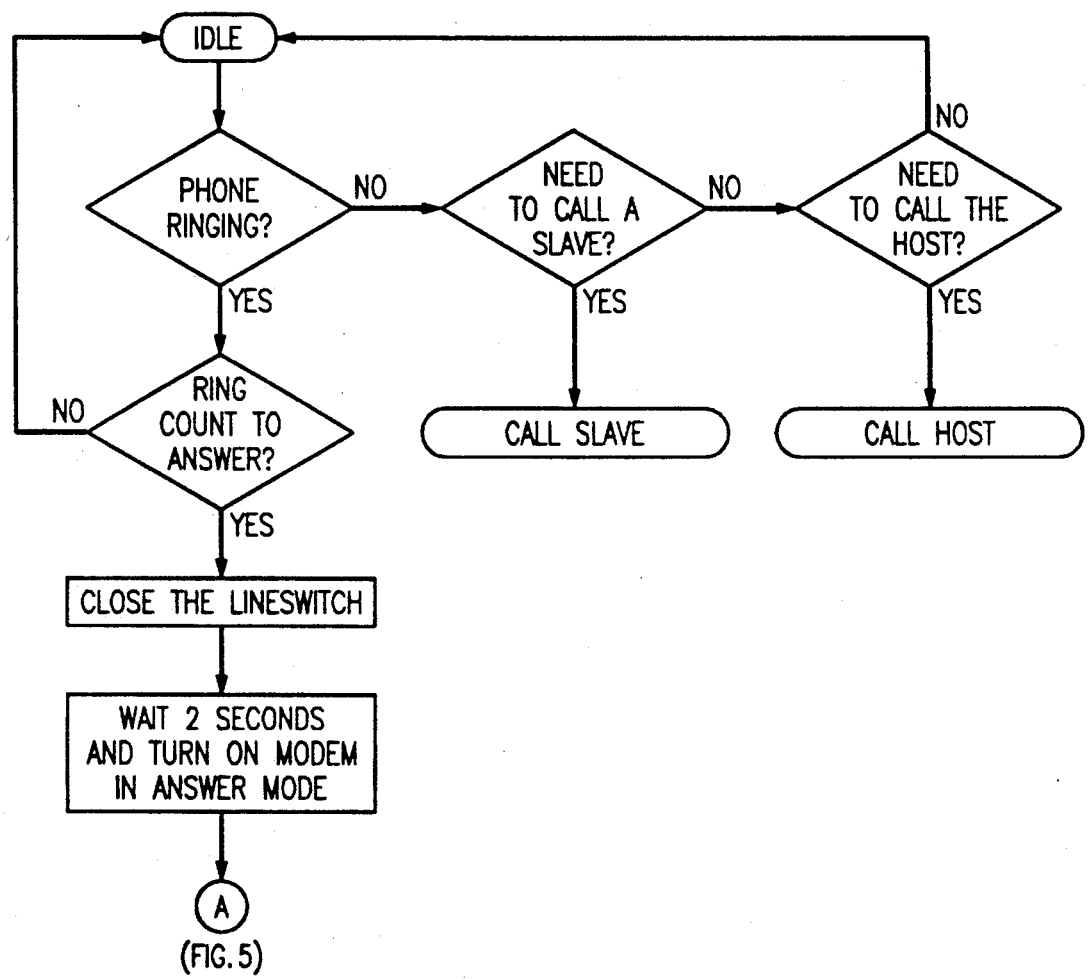
FIGS. 4,5 is a flow diagram of a telephone station showing its general operating program as related to tasks performed by a Master station.
Figure 5:
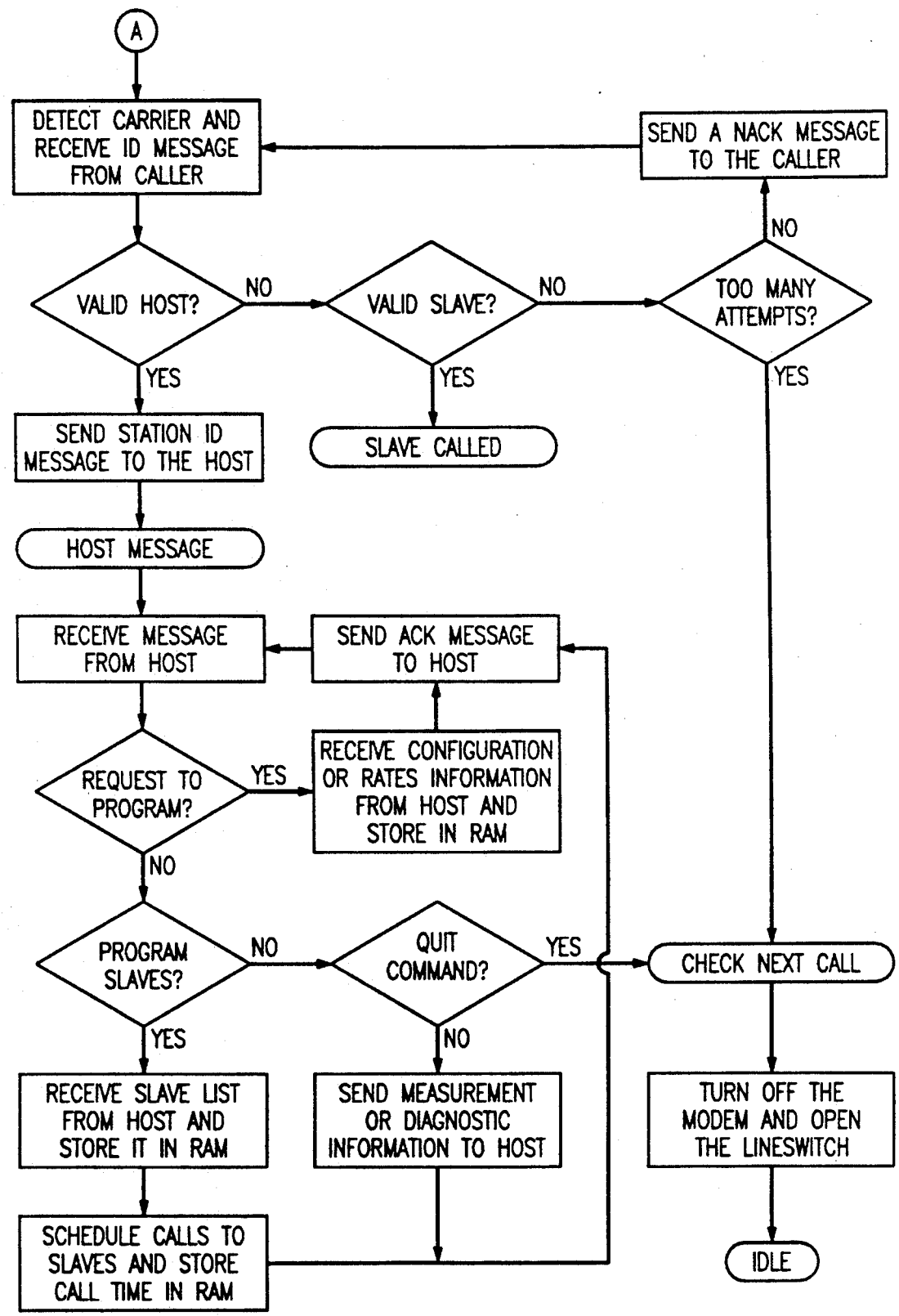
Figure 6:
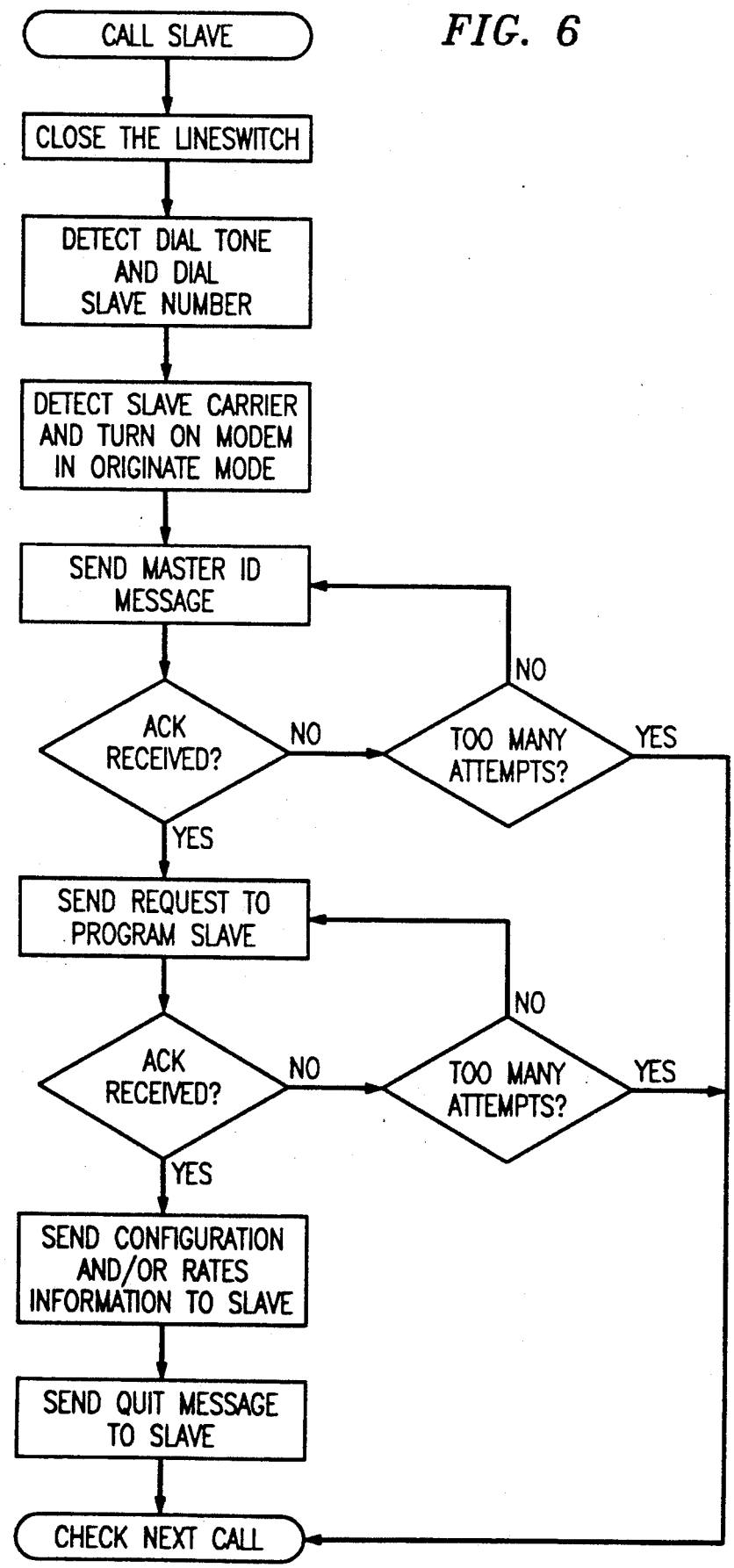
FIG. 6 is a flow diagram of a telephone Master station showing a subroutine invoked by its general operating program when calling a Slave station.
Figure 7:
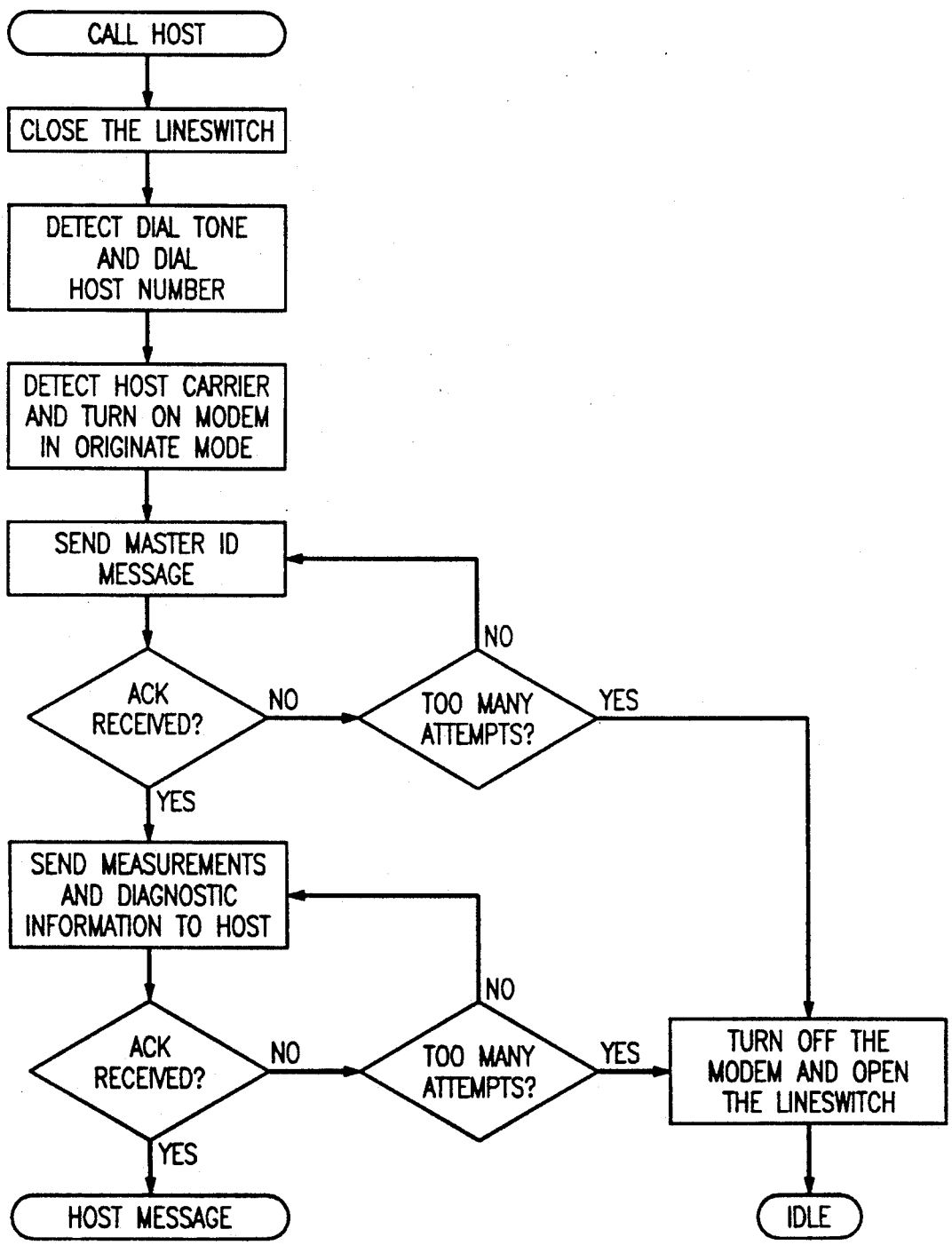
FIG. 7 is a flow diagram of a telephone Master station showing a subroutine invoked by its general operating program when calling the Host computer.

FIG. 4 is a flow diagram which discloses the operation of a telephone station showing its secondary function as a member of a reporting hierarchy. In particular, its operation as a Master station is shown. The Master station is in an IDLE state, insofar as its secondary function is concerned, unless there is a need to call the Host computer or a Slave station, or unless it is answering an incoming call. The subroutine used when calling the Slave station is shown in FIGS. 5, 6 and the subroutine used when calling the Host computer is shown in FIG. 7; both will be discussed below. The need to call the Host computer generally arises because of a diagnostic condition or a scheduled reporting time has occurred. The need to call a Slave station generally arises when information from the Host needs to be forwarded or because a scheduled reporting time has occurred.

Figure 8:
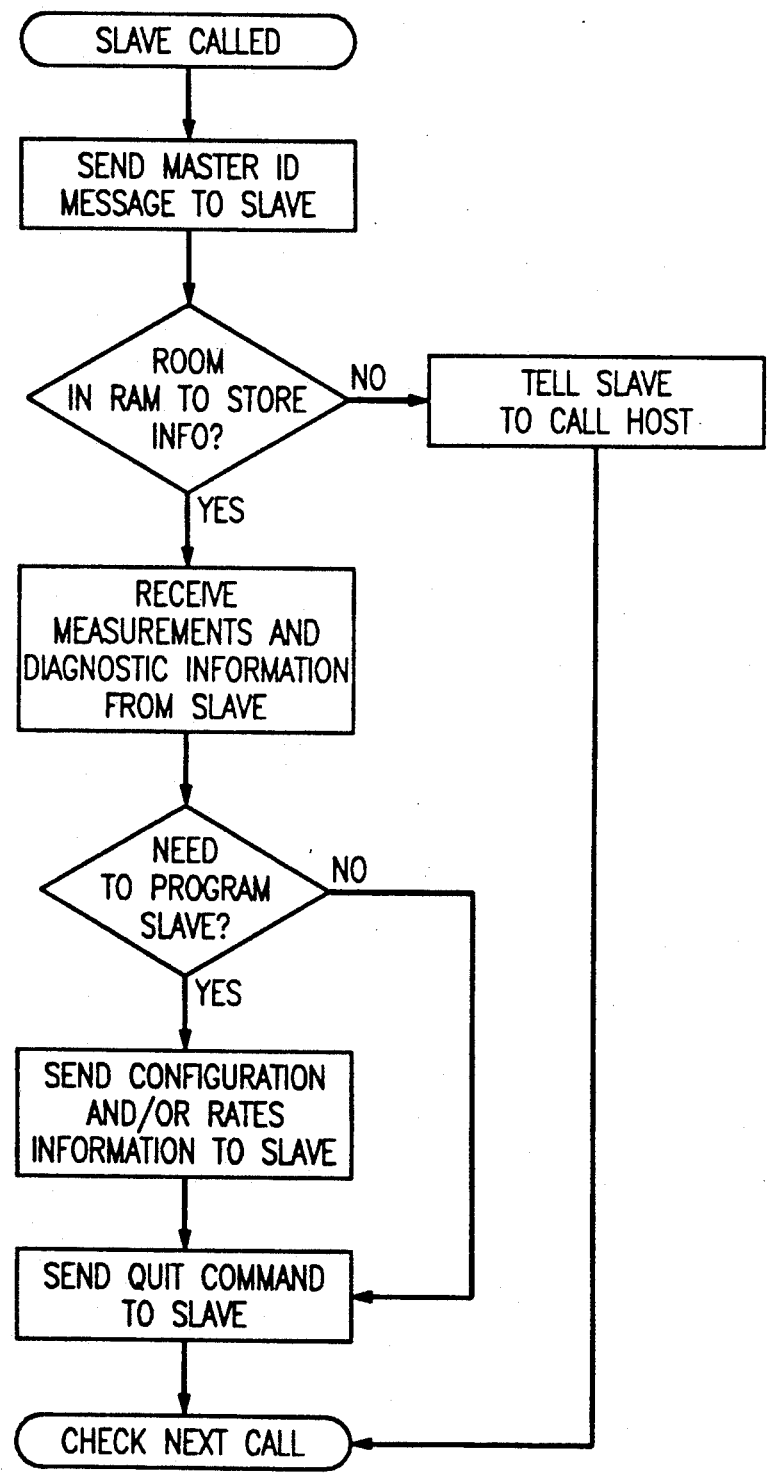
FIG. 8 is a flow diagram of a telephone Master station showing a subroutine invoked by its general operating program when calling back a Slave station.

After a predetermined number of rings, the telephone station automatically answers an incoming call by closing lineswitch 213. The station may be programmed to automatically answer after different ring counts during five different time periods covering 24 hours. Each of the time periods may be programmed to apply to different days of the week. After 2 seconds, modem 215 is turned on in the answer mode. The only allowable callers are the Host computer and the Slave stations. Validation of the caller proceeds by the caller transmitting an identification (ID) message. The caller is given several attempts to transmit a valid ID message. The Master station responds to invalid messages by returning a negative acknowledgment (NACK) message which basically invites the caller to retransmit the ID message. After a fixed number of unsuccessful attempts, however, the modem is turned off and the lineswitch is opened to effectively hang-up the telephone station. In the event that the caller is identified as a valid Slave station, the subroutine of in FIG. 8 is followed. In the event that the caller is identified to be the Host computer, the Master station authenticates itself to the Host by sending its ID message. If the ID message is acceptable to the Host, then it delivers a message to the Master station. After the message is delivered, the Host either reprograms the Master station, or commands the Master to reprogram its Slave stations, or commands the Master to send measurements/diagnostic information to the Host. Reprogramming the Master station may simply a matter of downloading new rates information into RAM 240 or downloading new operating instructions into the RAM which, if the Master is being converted into a Slave, includes the telephone number of its new Master station. Once this data is downloaded, the station sends an acknowledgment (ACK) message to the Host. When the Maseter station is commanded to reprogram Slave stations, the Host downloads the telephone numbers of the Slave stations into RAM 240 of the Master station which then schedules calls to each of the Slaves. After sending the ACK message to the Host, the Master station awaits the next message from the Host. A QUIT command from the Host causes the Master to terminate the call by opening the lineswitch.

The subroutine followed by the Master station when calling a Slave station is shown in FIGS. 5, 6. Lineswitch 213 is closed causing dial tone to be sent to the station which is detected by Call Progress Detector 217. Thereafter, the telephone number of a Slave station is dialed. When the Slave station answers, it transmits a carrier signal which is detected by modem 215 and placed in the originate mode. The Master station then identifies itself to the Slave station and waits for an ACK message. If it is not received within a predetermined time, it retransmits its ID message. If too many attempts to send the Master ID message are made without acknowledgment, further attempts are discontinued. After an ACK is received from the Slave station, a request to program the Slave is transmitted which must be acknowledged by the Slave station before proceeding. If too many requests to program the Slave station are made without acknowledgment, further attempts are discontinued. Once the Slave station acknowledges the programming request, the Master station downloads configuration and/or rate information into RAM 240 of the Slave station. A QUIT message is sent to the Slave to terminate the call.

The subroutine followed by the Master station when calling the Host computer is shown in FIG. 7. Lineswitch 213 is closed causing dial tone to be sent to the station which is detected by Call Progress Detector 217. Thereafter, the telephone number of the Host computer is dialed. When the Host answers, it transmits a carrier signal which is detected by modem 215 and placed in the originate mode. The Master station then identifies itself to the Host and waits for an ACK message. If it is not received within a predetermined time, it retransmits its ID message. If too many attempts to send the Master ID message are made without acknowledgment, further attempts are discontinued. After an ACK is received from the Host computer, measurements and diagnostic information are sent to the Host computer which must be acknowledged by the Host before proceeding. If too many requests to send measurements and diagnostic information are made without acknowledgment, further attempts are discontinued. Once the Host acknowledges receipt of this information, it may then deliver messages to the Master station in accordance with the protocol discussed above in connection with FIG. 4.

FIG. 8 is a flow diagram which discloses the steps performed by the Master station when it calls a Slave station. Such calls are made routinely by the Master station to gather measurement information from the Slave. After the Slave station is called by the Master, the Master sends its ID message. If there is sufficient available memory in the Master station RAM, it receives measurements and diagnostic information from the Slave; otherwise, the Slave is instructed to call the Host computer directly. The call is terminated at this time by transmitting a QUIT command to the Slave unless the purpose of the call was to reprogram the Slave with new configuration and/or calling rate information. Programmable Master parameters include the following:

Slave telephone list (variable length) including:
Slave telephone number
Slave password
Slave data categories
Slave answer window
Slave data memory capacity limit When a Master station communicates with a Host, the Host must tell the Master to update each Slave that needs to be updated. The Master then scans its list of Slave telephones to determine from that list if any of the Slaves must be updated. It will then schedule calls to the Slaves. (The calling times must be compatible with the Slave's answer windows and therefore may not be immediate.) The Master will try a predetermined number of times to contact a Slave. It it is not successful, it will send an alarm to the Host indicating which Slave(s) could not be updated. If the Host determines that a Slave has not reported, directly or through its Master, it will call the Slave.

Slave Station Operation

Reference is made to FIG. 3 regarding the identification of specific components that are identified in connection with the following routines and subroutines used by the Slave station.

Figure 9:
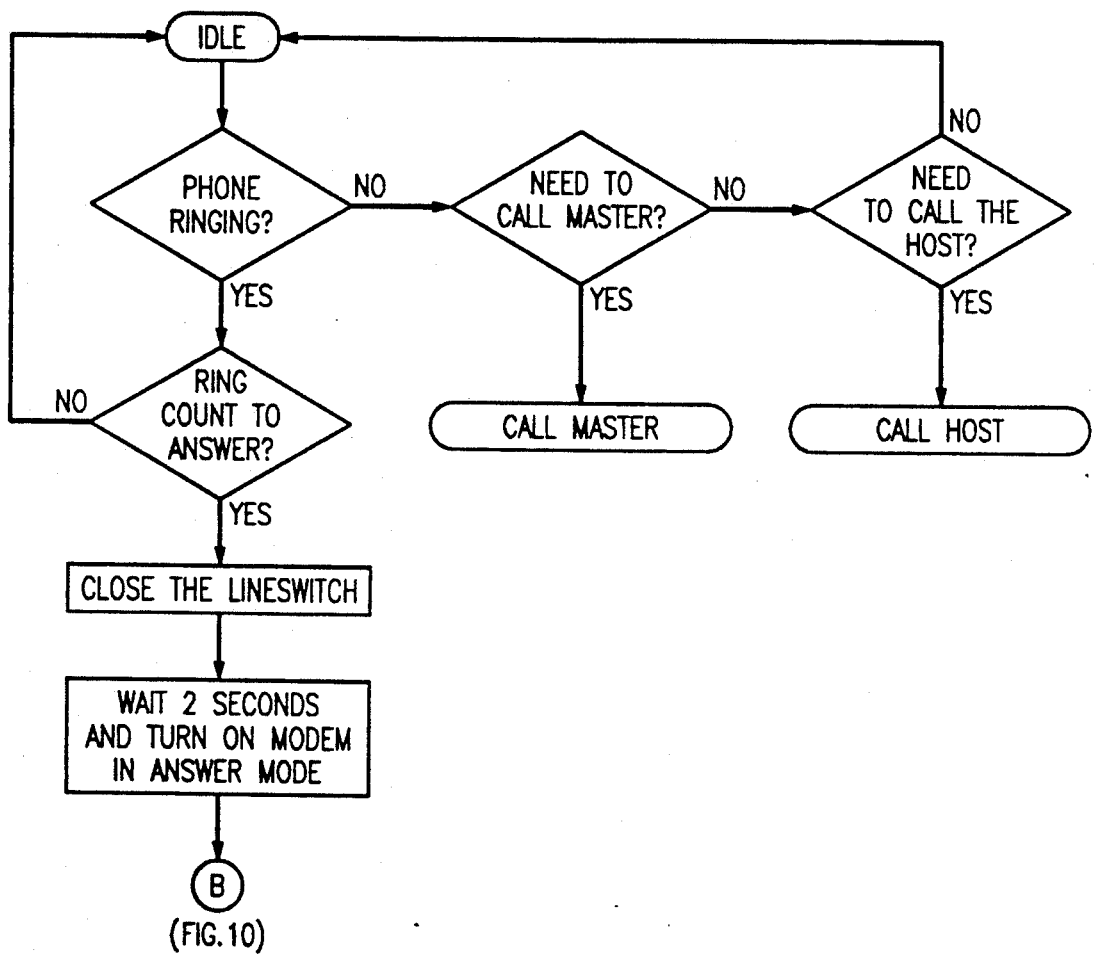
FIGS. 9, 10 is a flow diagram of a telephone Slave station showing its general operating program as related to tasks performed by a Slave station.
Figure 10:
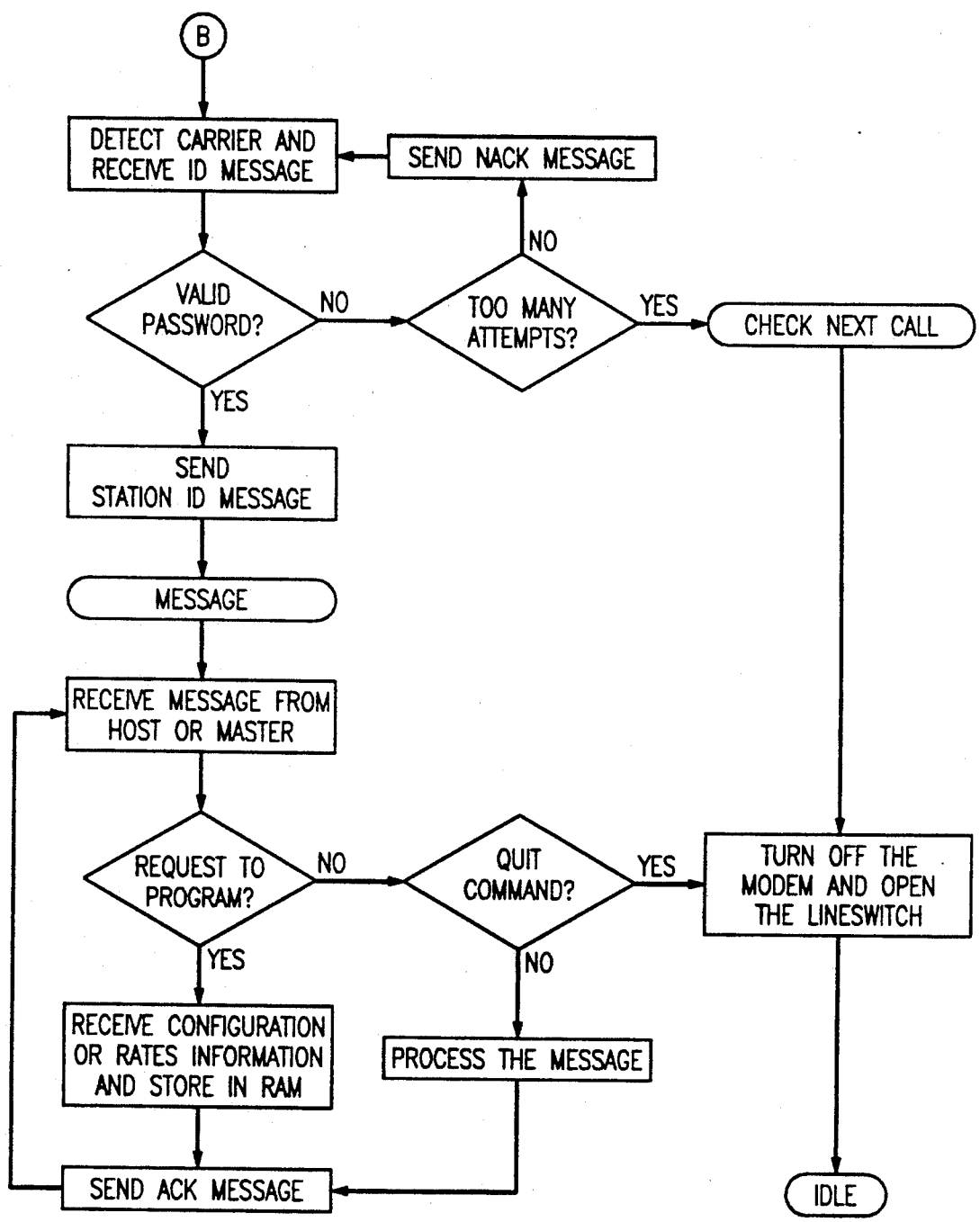

FIG. 9, 10 is a flow diagram which discloses the operation of a telephone station showing its secondary function as a member of a reporting hierarchy. In particular, its operation as a Slave station is shown. The Slave station is in an IDLE state, insofar as its secondary function is concerned, unless there is a need to call the Host computer or it is answering an incoming call. The need to call the Host computer generally arises because measurement/diagnostic information needs to be transmitted, but the associated Master station has insufficient room in its RAM to receive the information. In that situation, the Master instructs the Slave station to report such information directly to the Host computer as was already discussed in connection with FIG. 8. The steps taken by the Slave station when calling the Host computer are identical to those taken by the Master station and shown in FIG. 7.

After a predetermined number of rings, the Slave station automatically answers an incoming calling by closing lineswitch 213. The Slave station may be programmed to automatically answer after different ring counts during five different time periods covering 24 hours. Each of the time periods may be programmed to apply to different days of the week. After 2 seconds, modem 215 is turned on in the answer mode. The only allowable callers are the Host computer and designated Master stations. Validation of the caller proceeds by the caller transmitting an identification (ID) message. The caller is given several attempts to transmit a valid ID message. The Slave station responds to invalid messages by returning a NACK message which basically invites the caller to retransmit the ID message. After a fixed number of unsuccessful attempts, however, the modem is turned off and the lineswitch is opened to effectively hang-up the Slave telephone station. In the event that the caller is identified as a valid Host or Master, the Slave station authenticates itself by sending its ID message. If the ID message is acceptable, then a message is received from the Host or Master. After the message is received, the Slave station either receives reprogramming information or a QUIT command. Reprogramming the Slave station may simply a matter of downloading new calling rate information into RAM 240 or downloading new operating instructions into the RAM which, if the Slave is being converted into a Master, includes the telephone number of its associated Slave stations. Once this data is downloaded, the station sends an ACK message to the caller. A QUIT command causes the station to terminate the call by opening the lineswitch.

Slave stations may be programmed from the Host or a Master and may send data to either. When it is programmed, a Slave must know where to call back for verification. During programming, the Slave will receive a verification phone number and password from the Host or Master. Slaves may be programmed to send diagnostic alarms, collection box alarms, and measurement data to either of two different phone numbers. If alarms are pending for different Hosts, all alarms will be delivered to the collection box alarm host. The Slave will treat a Master as a Host. It will only know that some data goes to one phone number and other data goes to a different number. A secondary call-in number is also programmed into a Slave in case the Host or Master at the primary number can no longer accept calls from the Slave. Programmable Slave parameters include the following:

Host 1 Information:
telephone number
password
Host 2 Information:
telephone number
password
Secondary Host Information:
telephone number
password
Diagnostic Alarms Host Specifier (1 or 2)
Collection Box Alarm Specifier (1 or 2)
Measurements Host Specifier (1 or 2).

Station Programming

Figure 11:
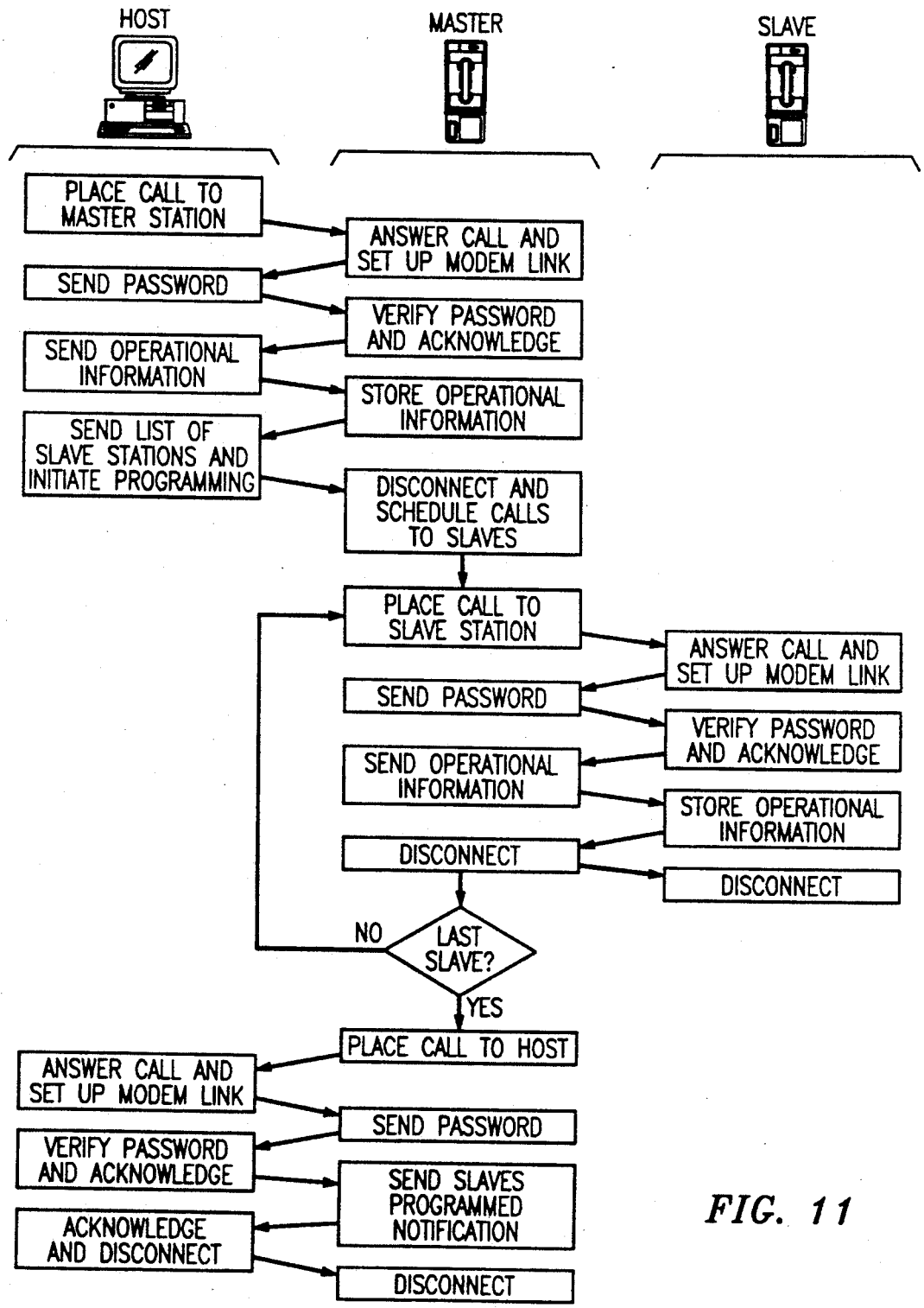
FIG. 11 is a flow diagram of the various steps performed during the distribution of operational information from the Host to its Master and Slave stations.

Slave stations are programmed to operate in a particular manner according to the flow diagram of FIG. 11. Slave stations are not directly called by the Host computer for reasons of economy and efficiency. Rather, the various Master stations are commanded to forward operational information to the Slaves. Operational information includes telephone call charging rates, instructions for operating as a Master station or a Slave station, ID message (password), and telephone numbers of associated stations. Slave programming commences with a telephone call, via the PSTN, from the Host computer to a Master station. Information is transmitted, illustratively using 300-baud modems, and passwords are exchanged to verify the calling and called terminals. Thereafter, operational information is transmitted to the Master station which is stored along with a list of Slave stations to be programmed. The Master station then disconnects from the Host computer and places calls to each of the Slave stations. After exchanging passwords, the operational information is downloaded in the Slave's RAM. After the last Slave has received the operational information, the Master station calls the Host computer to notify it that the task has been completed. Like all communications between stations, passwords are exchanged at the beginning of the call for enhanced security.

Figure 12:
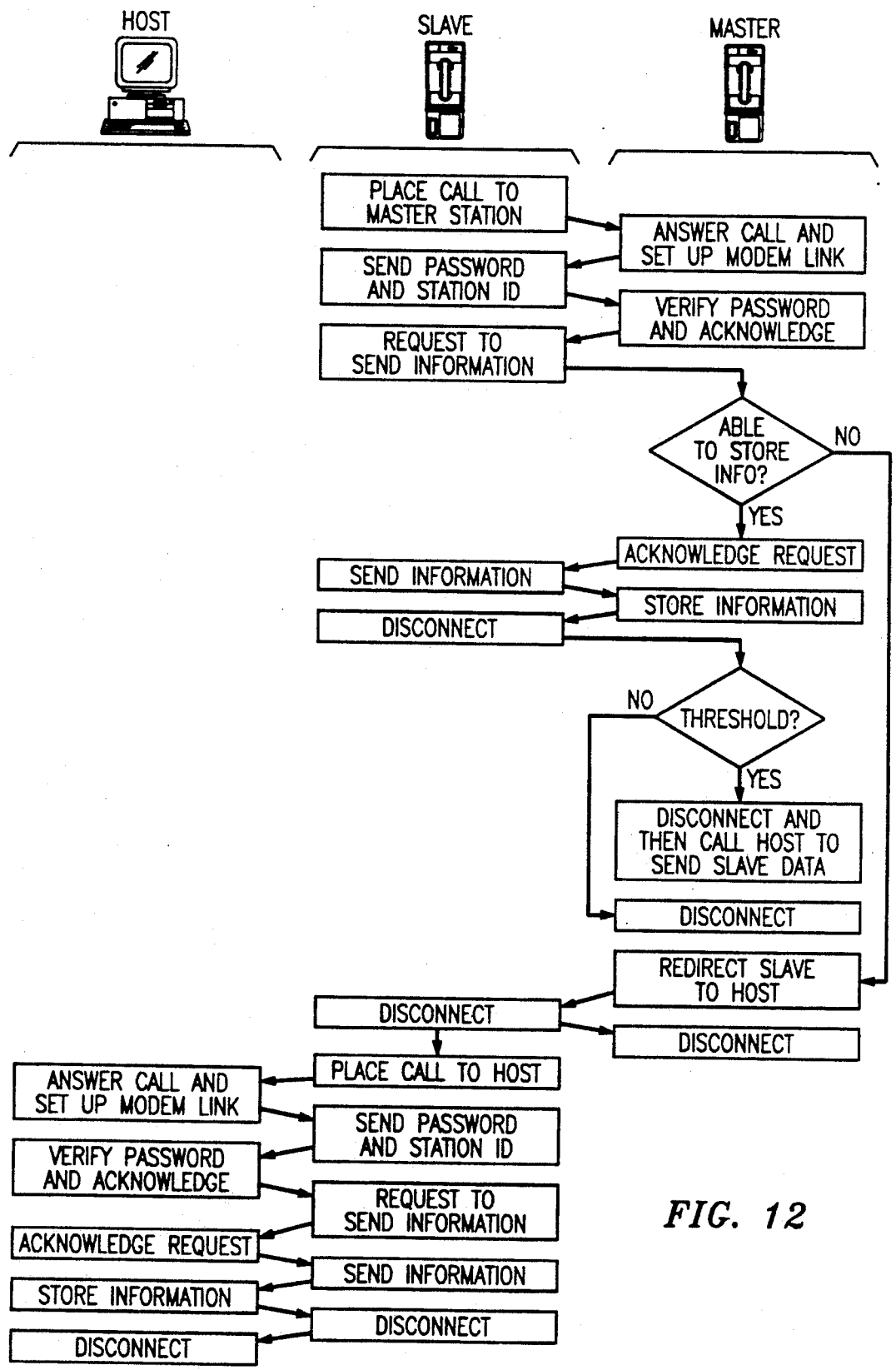
FIG. 12 is a flow diagram of the various steps performed during the transmission of maintenance information from a Slave station to the Host computer via its Master station.

Normally, a Slave station is able to deliver measurement information to its associated Master station. Such measurement information includes diagnostic and alarm data as well as call statistics and collection box fill. As indicated in the flow diagram of FIG. 12, if the Master station is able to accommodate the information, it is accepted from the Slave station and stored. After disconnecting the Slave station, the Master station determines if the full memory space in its RAM 240 exceeds a predetermined threshold (insufficient memory space to store the measurement information from another Slave station); and, if so, the Master station forwards its stored measurement information to the Host computer. In the event that the Master station has insufficient available memory space when the Slave station calls, the Slave station is instructed to call the Host computer directly.

Figure 13:
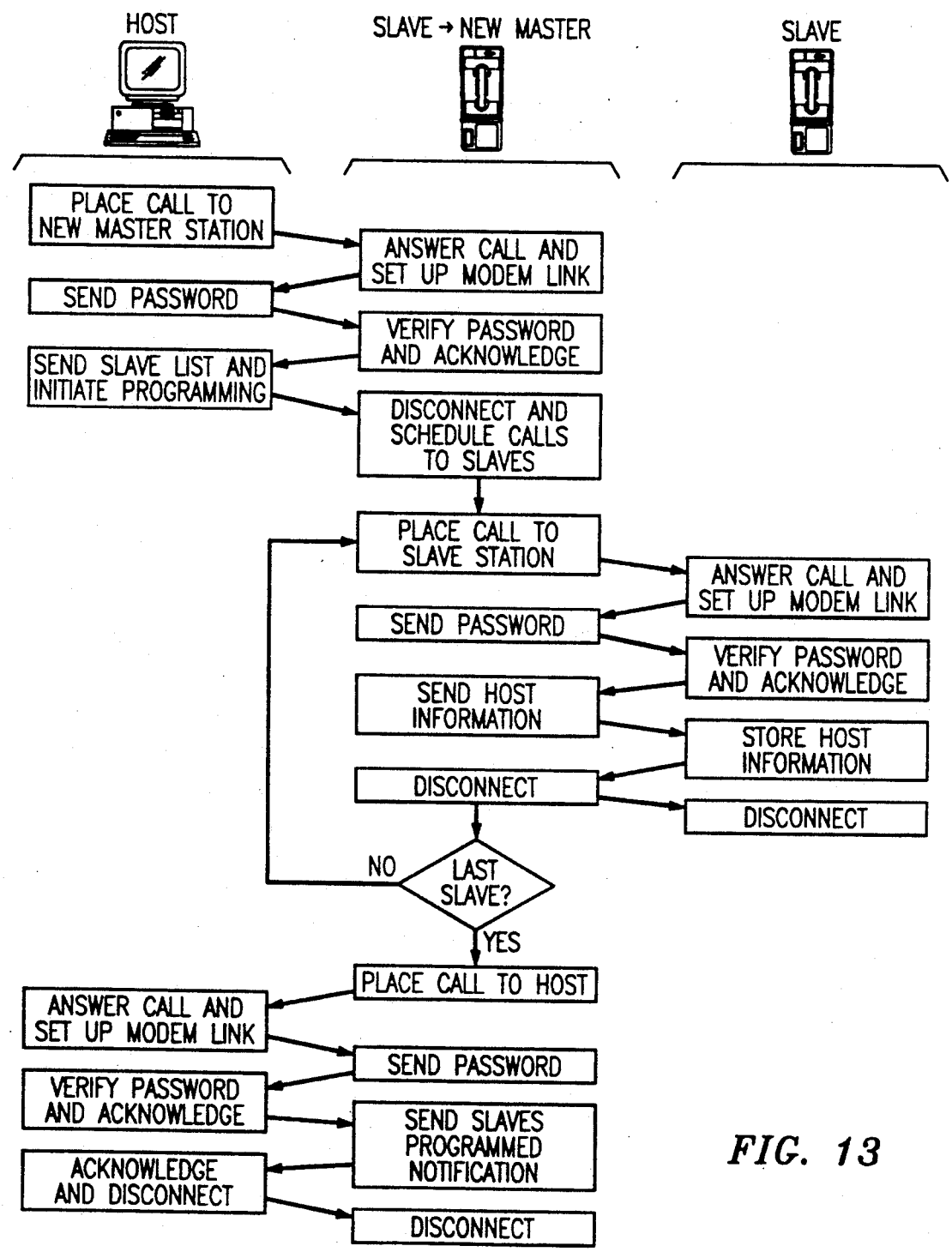
FIG. 13 is a flow diagram of the various steps performed by the Host computer when changing a Slave station to a Master station.

FIG. 13 illustrates the situation in which a Slave station is reconfigured to take on the functions of a Master station. The Host computer calls the Slave station (new Master station) and exchanges passwords. Thereafter, the Host sends a list of new Slave stations associated with the new Master followed by the instructions necessary for the new Master station to function as a Master station. Alternatively, each telephone station could store all the instructions needed to function as a Master station or a Slave station, and the Host would merely need to change its password or authorization code as well as the list of associated stations to cause the telephone station to function one way or the other. In the preferred embodiment of the invention, however, memory space is saved by rewriting the instructions that cause the telephone station to function as a Master or Slave station. After the telephone call with the Host computer is completed, the communication link is disconnected and calls are placed to each of the new Slave stations to forward the information from the Host computer; namely, the telephone number and password of the new Master station. After each of the new Slave stations have been contacted, the Master station places a call to the Host to provide notification that the new Slave stations have been programmed.

Figure 14:
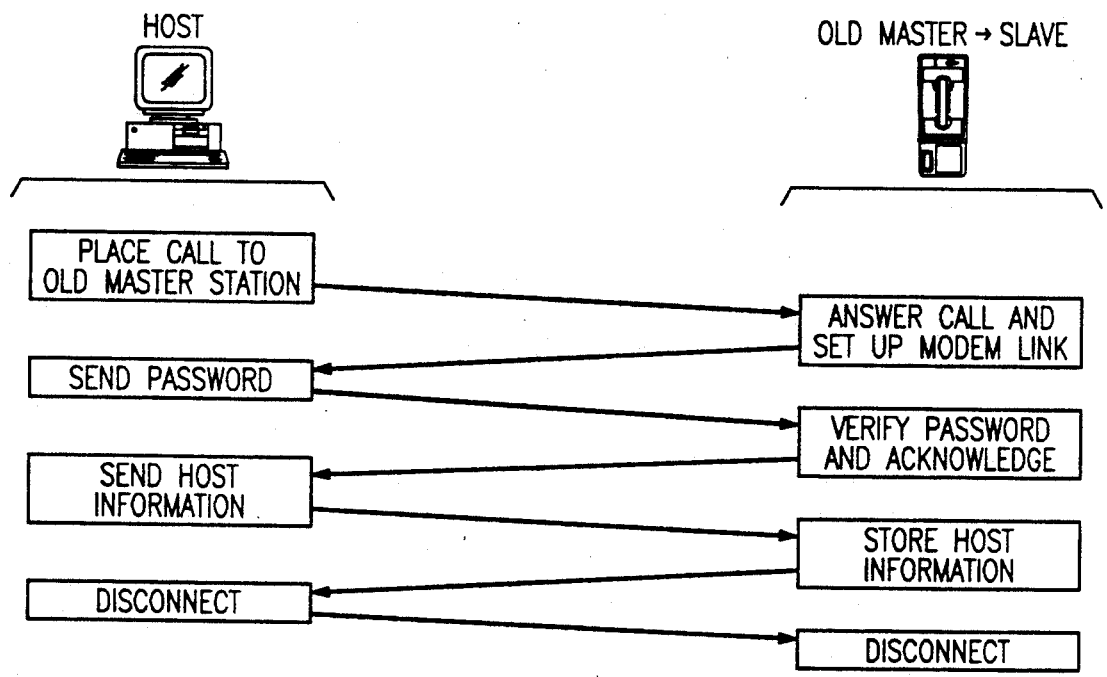
FIG. 14 is a flow diagram of the various steps performed by the Host computer when changing a Master station to a Slave station.

Finally, FIG. 14 illustrates the situation in which an old Master station is reconfigured to take on the functions of a Slave station. The Host computer calls the old Master station and exchanges passwords. Thereafter, the Host downloads new operational information into the RAM of the old Master station which comprises instructions needed to carry out the functions of a Slave station.

Although a particular embodiment has been shown and described, it is understood that various modifications can be made within the spirit and scope of the invention. These modifications include, but are not limited to, implementation of the invention in product or service dispensing apparatus other than public telephone stations, simultaneously storing program instructions in the memory of such dispensing apparatus which enable it to operate as a Master station or a Slave station, use of the invention in network configurations that are not structured in a hierarchal manner, and the use of the Host computer as a Master station.

We claim:

1. An intelligent terminal which primarily functions to deliver a predetermined product or service, the terminal including means for monitoring the status of its primary function, means for automatically answering incoming telephone calls, means for automatically dialing a selected telephone number from a first group thereof, and means for controlling the operations of said terminal in accordance with stored instructions, characterized by:

means for reporting the status of its primary function to another intelligent terminal;

means responsive to control information received over a communications link for replacing the stored instructions with a new set thereof; and means responsive to control information received over the communications link for replacing the first group of telephone numbers with a second group thereof, said first and second groups of telephone numbers being associated with other intelligent terminals; whereby the reporting relationship of a network of intelligent terminals can be remotely configured.

2. The intelligent terminal of claim 1 further including coin collecting apparatus, manual dialing apparatus, transmitter apparatus for converting audible sounds into electrical signals, receiver apparatus for converting electrical signals into audible sounds, and software instructions for causing the intelligent terminal to primarily function as a coin telephone station.

3. The intelligent terminal of claim 1 wherein the communications link comprises the Public Switched Telephone Network.

4. The intelligent terminal of claim 1 wherein the stored set of instructions comprise an operating protocol for a Slave station, and the new set of instructions comprise an operating protocol for a Master station in a network of intelligent terminals.

5. The intelligent terminal of claim 4 wherein the first group of telephone numbers includes the telephone number of at least one Master station and the telephone number of a Host computer which controls the network of intelligent terminals.

6. The intelligent terminal of claim 4 wherein the second group of telephone numbers includes the telephone numbers of a plurality of Slave stations and the telephone number of a Host computer which controls the network of intelligent terminals.

7. The intelligent terminal of claim 1 further including means for determining the validity of a password, received over the communications link, before allowing the stored instructions to be replaced by the new set of instructions.

8. In a hierarchal network comprising a Host computer, a plurality of Master stations and a larger plurality of Slave stations, the Master and Slave stations each executing a different set of operating instructions, a telephone terminal including: means for transmitting and receiving voice communication signals, means interconnecting said voice communication signals to a switched communications link, means for automatically answering incoming telephone calls, means for monitoring alarm conditions associated with the telephone terminal, and means for automatically dialing a stored telephone number, characterized by:

means for communicating the alarm conditions associated with the telephone terminal to the Host computer;

microprocessor means for controlling the operation of the telephone terminal in accordance with stored operating instructions; and means responsive to control information received over the switched communications link from the Host computer for modifying the operating instructions of the telephone terminal, said modifications causing the telephone terminal to function as a Master station or as a Slave station.

9. The telephone terminal of claim 8 wherein, as a Master station, the telephone terminal includes means storing a first set of operating instructions which include the telephone numbers of associated Slave stations and a first protocol for handling information exchange therewith, and means for automatically dialing the telephone numbers of the associated Slave stations.

10. The telephone terminal of claim 8 wherein, as a Slave station, the telephone terminal includes means storing a second set of operating instructions which include the telephone number of an associated Master station and a second protocol for handling information exchange therewith, and means for automatically dialing the telephone number of the associated Master station in response to an alarm condition.

11. In a communication network comprising a Host computer, a plurality of Master stations and a plurality of Slave stations associated with each Master station, the Master and Slave stations each executing different operating instructions, the Master station including: means for transmitting and receiving information signals; means interconnecting said information signals to a switched telecommunications link; means for automatically answering incoming telephone calls; means for automatically dialing telephone numbers of the Host computer and the associated Slave stations; microprocessor means for controlling the operation of the Master station in accordance with stored program instructions; and means responsive to control information received over the telecommunications link from the Host computer for modifying the stored program instructions to change the Master station into a Slave station.

12. The invention of claim 11 wherein the Master station comprises a microprocessor-controlled coin telephone station.

13. In a communication network comprsingin a Host computer, a plurality of Master stations and a plurality of Slave stations associated with each Master station, the Master and Slave stations each executing different operating instructions, each Slave station including: means for transmitting and receiving information signals; means interconnecting said information signals to a switched telecommunications link; means for automatically answering incoming telephone calls; means for automatically dialing a telephone number of the associated Master station; microprocessor means for controlling the operation of the Slave station in accordance with stored program instructions; and means responsive to control information received over the telecommunications link from the Host station for modifying the stored program instructions to change the Slave station into a Master station.

14. The invention of claim 13 wherein the Slave station comprises a microprocessor-controlled coin telephone station.

15. A hierarchal reporting system comprising a Host computer, a plurality of Master stations, and a plurality of Salve stations associated with each Master station, each Master station comprising:

means storing a first set of operating instructions and telephone numbers of its associated Slave stations;

means for transmitting and receiving digital information signals, means interconnecting said digital information signals to a switched communications link;

means for monitoring alarm conditions associated with the Master station;

means for automatically dialing a stored telephone number, in response to means for automatically answering incoming telephone calls; and means responsive to digital information signals received over the switched communications link from the Host computer for replacing the first set of operating instructions with a second set of operating instructions to thereby change the Master station into a Slave station, each Slave station comprising:

means storing the second set of operating instructions and a telephone mumber of its associated Master station;

means for transmitting and receiving digital information signals, means interconnecting said digital information signals to a switched communications link;

means for automatically answering incoming telephone calls; and means for monitoring alarm conditions associated with the Slave station;

means for automatically dialing the telephone number of the associated Master station in response to an alarm condition; and means responsive to digital information signals received over the switched communications link from the Host computer for replacing the second set of operating instructions with the first set of operating instructions to thereby change the Slave station into a Master station.

16. The hierarchal communications network of claim 15 wherein the Slave stations and the Master stations comprise microprocessor-controlled coin telephone stations.

17. In a communication network comprising a Host computer, a plurality of Master stations and a plurality of Slave stations associated with each Master station, a method for converting an intelligent terminal, configured as a Master station, into a Slave station comprising the steps of:

storing a first set of operating instructions at the intelligent terminal which cause it to perform predetermined Master station functions;

communicating with the Host computer over the Public Switched Telephone Network;

verifying the identity of the Host computer; and replacing the first set of operating instructions with a second set of operating instructions at the intelligent terminal if the identity of the Host computer is verified, the second set of operating instructions including the telephone number of an associated Master station and causing the intelligent terminal to function as a Slave station.

18. The method of claim 17 wherein the intelligent terminal comprises a microprocessor-controlled coin telephone station.

19. In a communication network comprising a Host computer, a plurality of Master stations and a plurality of Slave stations associated with each Master station, a method for converting an intelligent terminal, configured as a Slave station, into a Master station comprising the steps of:

storing a second set of operating instructions at the intelligent terminal which cause it to perform predetermined Slave station functions;

communicating with the Host computer over the Public Switched Telephone Network;

verifying the identity of the Host computer; and replacing the second set of operating instructions with a first set of operating instructions at the intelligent terminal if the identity of the Host computer is verified, the first set of operating instructions including telephone numbers of associated Slave stations and causing the intelligent terminal to function as a Master station.

20. The method of claim 19 wherein the intelligent terminal comprises a microprocessor-controlled coin telephone station.

* * * * *